United States Patent [19]
Achelpohl et al.

[11] Patent Number: 5,588,944
[45] Date of Patent: Dec. 31, 1996

[54] APPARATUS FOR WELDING THE TUBULAR SECTIONS OF SACKS, BAGS OR THE LIKE

[75] Inventors: Fritz Achelpohl, Lienen; Hermann Sandmeier, Bielefeld, both of Germany

[73] Assignee: Windmöller & Hölscher, Lengerich/Westf., Germany

[21] Appl. No.: 282,481

[22] Filed: Aug. 1, 1994

[30] Foreign Application Priority Data

Aug. 2, 1993 [DE] Germany ............................ 43 25 877.8

[51] Int. Cl.⁶ ........................... B31B 19/60; B31B 21/60
[52] U.S. Cl. ........................... 493/205; 493/209; 53/374.5
[58] Field of Search ................................ 493/202, 205, 493/206, 207, 208, 209, 470, 471; 156/583.6, 583.7, 583.8, 583.9, 308.4, 567; 53/374.5, 375.4

[56] References Cited

U.S. PATENT DOCUMENTS

| | | |
|---|---|---|
| 3,762,282 | 10/1973 | Van Der Meulen . |
| 4,306,400 | 12/1981 | Coleman ............................... 53/374.5 |
| 4,338,082 | 7/1982 | Evers . |
| 4,495,745 | 1/1985 | Crescenzo ............................... 53/374.5 |
| 4,758,293 | 7/1988 | Samida ..................................... 493/208 |

FOREIGN PATENT DOCUMENTS

| | | |
|---|---|---|
| 871401 | 3/1953 | Germany . |
| 1070487 | 12/1959 | Germany . |
| 2207043 | 7/1977 | Germany . |
| 3833744 | 4/1990 | Germany . |

*Primary Examiner*—Jack W. Lavinder
*Attorney, Agent, or Firm*—Jacobson, Price, Holman & Stern, PLLC

[57] ABSTRACT

The invention concerns an apparatus for welding the tubular sections of sacks, bags or the like, having a rotating drum and with welding stations arranged on the periphery of the drum which rotate, fixed in position, with the drum, wherein the welding stations are arranged laterally each on one end side of the drum. To ensure a crease-free processing of the tubular sections to be welded, grippers that can be caused to open and close are arranged on the drum in individual welding stations, for the seizing, holding and release of the tubular sections. A movable welding jaw of the welding station forms a flat bearing surface for the zone of the tubular section to be welded, while the drum itself, has a cylindrical peripheral surface.

6 Claims, 4 Drawing Sheets

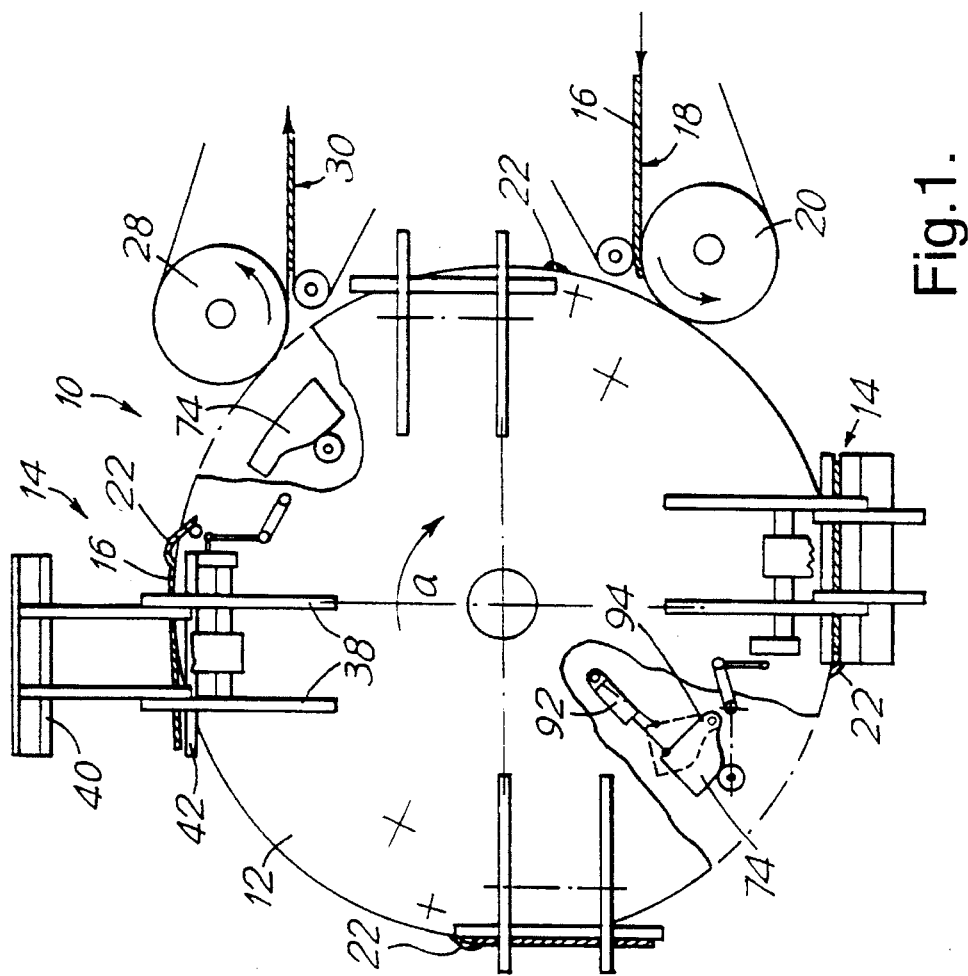
Fig.1.
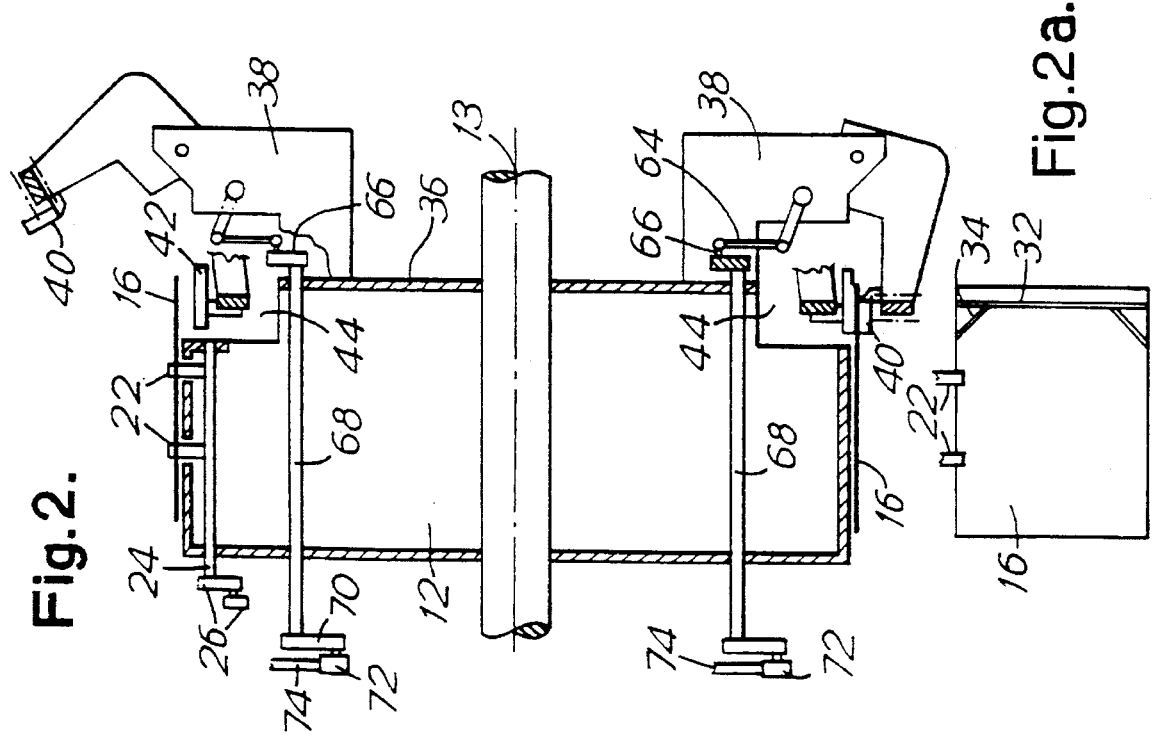
Fig.2.
Fig.2a.

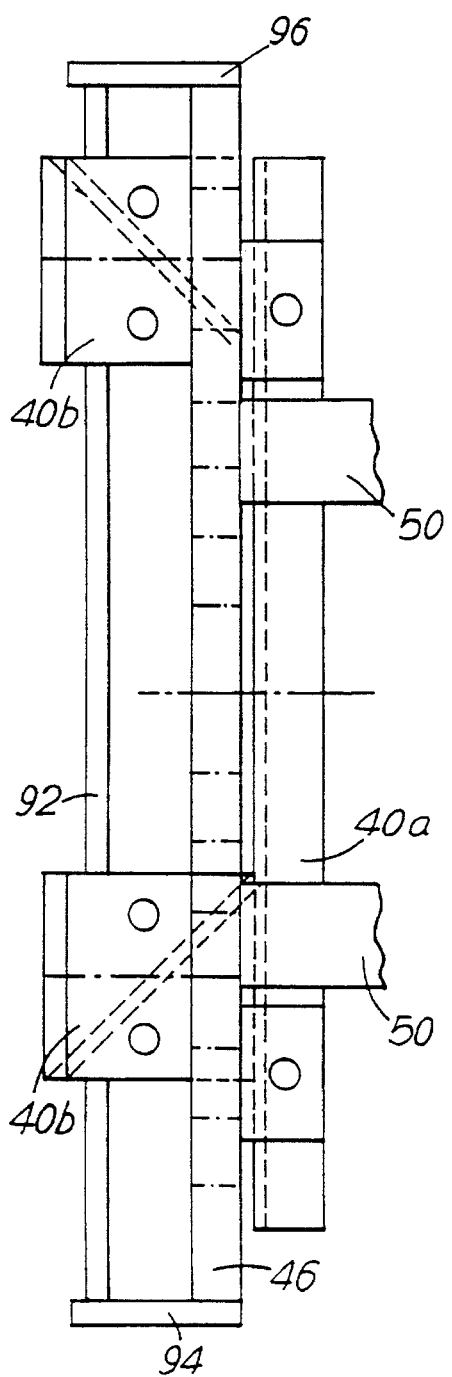
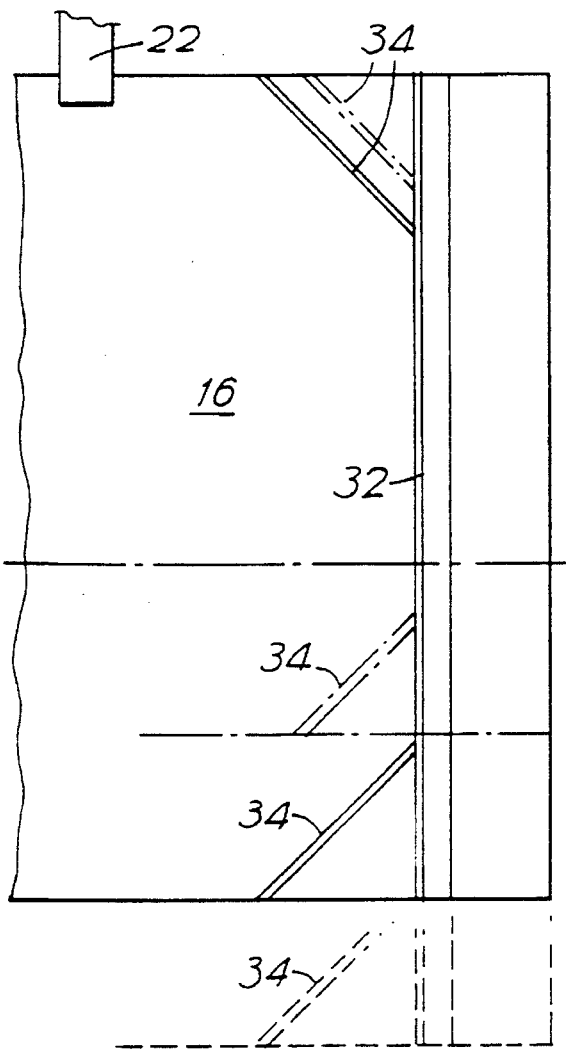

APPARATUS FOR WELDING THE TUBULAR SECTIONS OF SACKS, BAGS OR THE LIKE

FIELD OF THE INVENTION

The invention concerns an apparatus for welding the tubular sections of sacks, bags or the like, comprising:—a rotating drum, and welding stations arranged on the periphery of the drum so as to rotate, fixed in position relative to with the drum, wherein the welding stations are arranged laterally each on one end of the drum.

PRIOR ART

Such an apparatus is already known, for example from the DE 38 33 744 A1. In that apparatus, the drum is formed as a regular multilateral generally cylindrical body. Conveyor belts run off over the bearing surfaces of the cylindrical body which enclose between them the tubular sections with a clamping action. The welding jaws are arranged laterally next to the conveyor belts. Because the tubular sections have to be carried between the belts and the flattened sections of the drum, undesirable creasing of the tubular sections occurs time after time, in particular in the running-in zone of the conveyor belts.

OBJECT OF THE INVENTION

It is the object of the invention to further develop an apparatus of the above type in such a way that the welding process can be carried out in a simple manner without malfunctions and without the tubular sections being creased or damaged.

SUMMARY OF THE INVENTION

Accordingly the present invention provides an apparatus for welding the tubular sections of sacks, bags or the like, comprising:—
- a rotating drum,
- welding stations arranged on the periphery of the drum so as to rotate with, while fixed relative to, the drum, wherein the welding stations are arranged laterally each on one of the end sides of the drum;
- on the drum, grippers that can be caused to open and close and are assigned to the individual welding stations for the seizing, holding and release of the tubular sections; and
- a movable welding jaw of the welding station, forming a flat bearing surface for the zone of the tubular section to be welded, while the drum itself has a cylindrical peripheral surface.

Preferably said movable welding jaw of the welding station which forms the bearing surface projects into a recess of the drum. With respect to the line of rotation of the drum, the jaw can be applied from below onto the zone of the tubular section to be welded, while the second welding jaw of the welding station can be swung in from the outside onto the zone of the tubular section to be welded.

The movable welding jaws can at first be applied largely without pressure, onto the zone to be welded and can subsequently be pressed on thereto.

The lower welding jaw can be pivotably connected, by means of resiliently deformable plates extending substantially parallel to each other, to a stand fixed to the drum and can be at the same time pivotably driven by means of a piston-and-cylinder arrangement that is articulated on a knee lever.

The upper welding jaw, that can be applied from the outside can be applied by means of a lever mechanism carried on a cam disk, in which arrangement the cam disk itself can in each case again be pivotable by means of a piston-and-cylinder arrangement.

The upper welding jaw that can be applied from the outside can be designed to be self-supporting by means of two compression springs acting on two levers of the lever mechanism.

Desirably the upper welding jaw that can be applied from the outside may comprise a support which carries the welding bar for the transverse weld seam. In addition, it may accommodate welding bars that are adjustable along the support for corner weld seams, and which can be secured thereon after an appropriate adjustment.

BRIEF DESCRIPTION OF THE DRAWINGS

Further objects and advantages are explained in greater detail below with reference to an example of the embodiment represented in the accompanying drawings, in which:—

FIG. 1 is a partly sectioned side view of an embodiment of the apparatus in accordance with the invention;

FIG. 2 is a cross-section through the apparatus of FIG. 1;

FIG. 2a shows a bag having seams formed by the apparatus of FIGS. 1 and 2;

FIG. 6 is a schematic top view of the upper welding jaw; and

FIG. 7 shows various tubular sections to be welded, with their corresponding transverse and corner weld seams.

DETAILED DESCRIPTION OF THE PREFERRED EMBODIMENT

Figure 3:
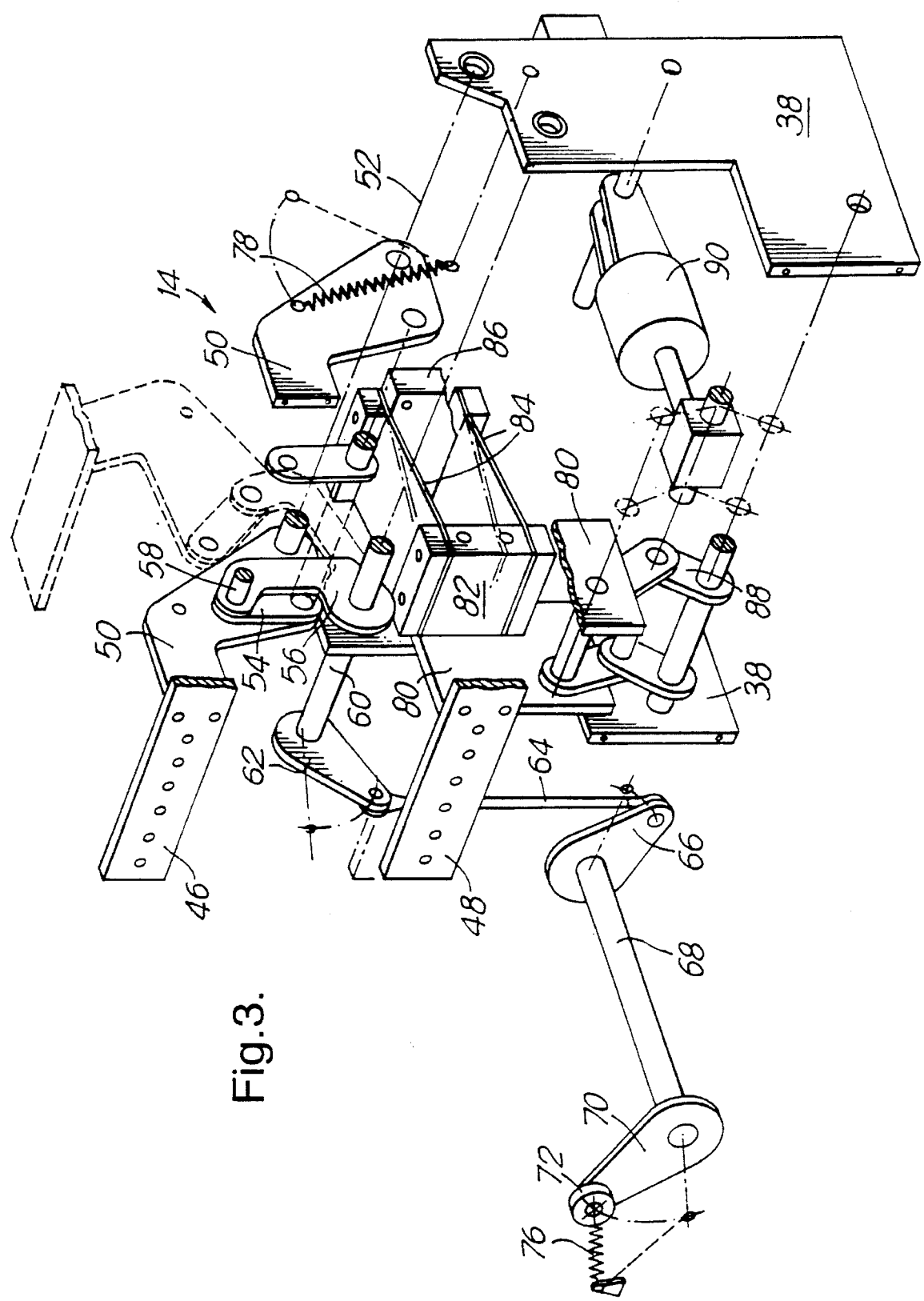
FIG. 3 is a perspective view of the welding station.

As shown in FIG. 1, the apparatus 10 consists of a drum 12 rotating in the direction of arrow a, and having four welding stations 14 distributed over its periphery. The bags 16 to be welded are fed by means of suitable belts 18 from which they are delivered, for example by means of a grooved gripper cylinder 20, to grippers 22 of the drum 12. As may be gathered from the sectional representation of FIG. 2, the grippers 22 can be caused to open and close by means of a suitable shaft 24 and a link motion mechanism 26, which is only schematically represented in FIG. 2.

The tubular sections to be welded are seized by means of the grippers 22 and are secured on the drum in the zone of the welding station 14. The transverse weld seams, and if required, the corner weld seam to be provided, are worked in laterally on the tubular section in the zone of the welding jaws during one rotation of the drum 12, and after the welding station grippers have been caused to open, the bag is taken off the drum surface by means of a take-off device 28 and is removed via a belt mechanism 30, as represented in FIG. 1.

A bag with a worked-in transverse weld seam 32 and corner weld seams 34 which is still held fast by the grippers 22, is schematically represented in FIG. 2a.

The structure and mode of operation of the welding stations 14 fixed to the drum will be explained in greater detail below.

Two holding plates 38 are welded each onto one a respective one of the end faces 36 of the drum 12 for accommodating the pivotable welding jaws 40 and 42. The welding jaw 42 which, starting from the axis of rotation 13 of the drum, lies at the bottom, projects into a corresponding recess 44 of the drum so that the bearing surface of the welding jaw 42 comes to lie in the end zone of the tubular section 16 to be welded. The exact structure of the welding station can be precisely gathered from the perspective view of FIG. 3 which has been drawn in a partly exploded representation. In FIG. 3, the welding jaws 40 and 42 themselves have not been shown. It is rather the partly broken away welding jaw holders 46 and 48 that are here represented. The welding jaw holders are respectively shown once more in dots and dashes in their pivoted positions, so that on the basis of FIG. 3, the pivoting path of the welding station 14 can be straightforwardly followed.

The welding jaw holder 46 of the upper welding jaw is screwed or welded onto pivoting levers 50, which are mounted on one side in the holding plates 38 pivotably about an axis 52. An adjustment lever 54 acts on an articulation point of the pivoting levers 50, which adjustment lever is connected to a further adjustment lever 56 for rotation round a pin 58. The adjustment lever 56 is in each case fixed on a pin 60, at whose other end is disposed a further lever 62 which is connected by means of a link 64 to a lever 66 of a shaft 68 and a further lever 70. A roller 72, arranged at the free end of the lever 70, can roll on a cam plate 74 as represented in FIGS. 1 and 2. From FIG. 2, it may be gathered that the shaft 68 is carried transversely through the drum 12 and that the cam plate 74 lies on the opposite side of the drum 12. By suitable guidance of the roller 72 on the cam plate, the upper welding Jaw is transferred from its solid position into the position shown in dashes, in FIG. 3. The lever mechanism here explained is, according to the represented embodiment, self-supporting by virtue of two compression springs 76 and 78 which act at one side on the lever 70 and on the other side on the pivoting lever 50 in the way shown in FIG. 3. This means that after an appropriate pivoting, the upper welding jaw remains in this position without any further external holding forces.

The lower welding jaw holder 48 is connected by means of plates 80 to a block 82. The block 82 is connected, by means of resiliently deformable blades 84 extending parallel to each other, to a cross bar 86 extending between the supports 38. The resiliently deformable blades 84 can be pivoted from the position shown in solid lines in FIG. 3 into a position shown in dot and dash lines in FIG. 3. A knee lever mechanism 88, which can be acted on in the knee joint by a piston-and-cylinder arrangement 90, serves for the pivoting (FIG. 3).

FIGS. 1 and 2 show that in its bottom position shown in the representation the welding station 14 is closed, the appropriate closing of the upper welding jaw being effected by means of the cam plate 74. As shown in FIG. 1, the cam plate 74 can itself be pivoted in turn by means of a piston-and-cylinder arrangement 92 round a pivot 94. In the upper position of the welding station 14 shown in FIGS. 1 and 2, the two welding jaws 40 and 42 have each been opened.

The sequence of the welding operation carried out by means of the welding station 14 can be explained in greater detail with reference to FIGS. 4 and 5.

Figure 4:
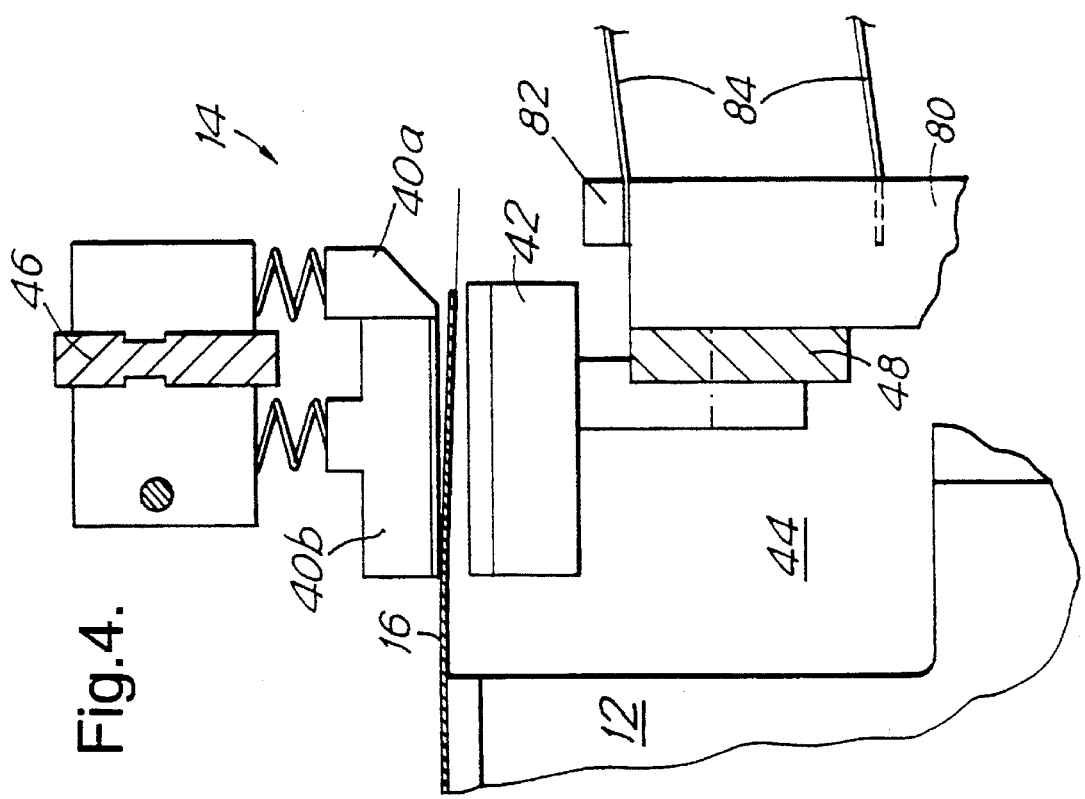
FIGS. 4 and 5 are schematic sections through a part of the welding station showing it in various positions of the welding jaws.
Figure 5:
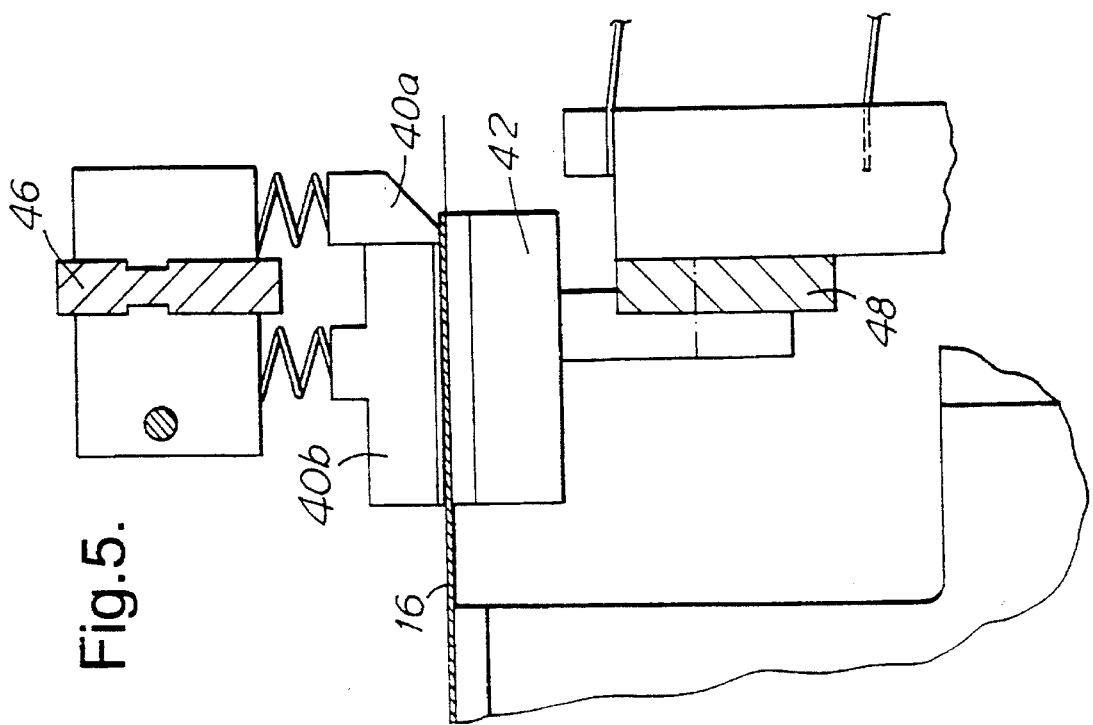

In FIG. 4 the upper welding jaw 40, which consists of the welding jaw 40a for the transverse weld seam and the two welding jaws 40b for the corner weld seam, has been first applied. This is done by means of the cam plate 74 as explained above.

The lower welding jaw 42 has here not yet been applied. In the method step shown in FIG. 5, wherein the welding is effected, the lower welding jaw 42 is then applied by actuation of the piston-and-cylinder arrangement 90. It is only at this point that the upper and lower welding jaws are pressed against each other. As indicated in FIGS. 4 and 5, the upper welding jaw 40 is connected to the holder 46 by means of springs.

In FIG. 6, the welding jaw holder 46, which is directly screwed or welded onto the pivoting levers 50, carries at first the welding jaw 40a for the transverse weld seam. The welding jaws 40b for the corner weld seams are arranged for displacement on the welding jaw holder 46 in the way shown in FIG. 6. In this arrangement, the welding jaws 40b for the corner weld seams may in addition be carried on a rod 92 which is rigidly connected to the welding jaw holder 46 by means of side plates 94 and 96.

FIG. 7 respectively shows in solid lines, dashed lines, and dot-dashed lines, bags of different widths which can all be processed by the apparatus in accordance with the invention, after the welding jaws 40b for the corner weld seams have been suitably adjusted.

I claim:

1. An apparatus for welding tubular sections of sacks, bags or the like, comprising:

a rotating drum, welding stations arranged on the periphery of the drum so as to rotate with, while fixed relative to, the drum, wherein the welding stations are arranged laterally each on one of end sides of the drum;

on the drum, grippers that can be caused to open and close and are assigned to the individual welding stations for seizing, holding and release of the tubular sections; and a movable welding jaw of the welding station, forming a flat bearing surface for the zone of the tubular section to be welded, while the drum itself has a cylindrical peripheral surface, said welding station including upper and lower ones of said welding jaws, of which the lower welding jaw can be pivotally connected by means of resiliently deformable plates extending substantially parallel to each other, to a stand fixed to the drum and being pivotable by means of a piston-and-cylinder arrangement that is articulated on a knee lever.

2. An apparatus according to claim 1, wherein said movable welding jaw of the welding station, which forms the bearing surface, projects into a recess of the drum and, with respect to a line of rotation of the drum, can be applied from below onto a zone of the tubular section to be welded, while a second welding jaw of the welding station can be swung in from outside onto the zone of the tubular section to be welded.

3. An apparatus according to claim 1, wherein the welding jaws can be initially applied largely without pressure onto a zone to be welded, and can subsequently be pressed thereagainst.

4. An apparatus according to claim 1, wherein the upper welding jaw, that can be applied from the outside, can be applied by means of a lever mechanism carried on a cam plate.

5. An apparatus according to claim 4, wherein said upper welding jaw that can be applied from the outside is self-supporting by means of two compression springs acting on two levers of the lever mechanism.

6. An apparatus according to claim 1, wherein the upper welding jaw, that can be applied from the outside, comprises a support which carries the welding bar for the transverse weld seam; and wherein welding bars for corner weld seams are adjustably arranged along the support and may be secured thereon.

* * * * *